United States Patent
Nichols et al.

(10) Patent No.: US 11,894,716 B2
(45) Date of Patent: Feb. 6, 2024

(54) ENERGY HARVESTING FOR A BICYCLE

(71) Applicant: SRAM, LLC, Chicago, IL (US)

(72) Inventors: Geoff Nichols, San Luis Obispo, CA (US); Sage Hahn, Chicago, IL (US); Hendrik Scott Devries, Portage, IN (US); Jeefrey Baltes, Colorado Springs, CO (US); Todd Baltes, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 17/080,451

(22) Filed: Oct. 26, 2020

(65) Prior Publication Data

US 2022/0131404 A1  Apr. 28, 2022

(51) Int. Cl.
| | |
|---|---|
| *H02J 7/35* | (2006.01) |
| *B62J 43/30* | (2020.01) |
| *H02S 40/38* | (2014.01) |
| *H02S 10/40* | (2014.01) |

(52) U.S. Cl.
CPC ............... *H02J 7/35* (2013.01); *B62J 43/30* (2020.02); *H02S 10/40* (2014.12); *H02S 40/38* (2014.12)

(58) Field of Classification Search
CPC ...... B60L 8/003; B60L 53/51; B60L 2200/46; B60L 2200/12; H02J 7/35; H02S 10/40; H02S 40/38
See application file for complete search history.

(56) References Cited

U.S. PATENT DOCUMENTS

| | | | |
|---|---|---|---|
| 9,006,560 B2 | 4/2015 | Shelef et al. | |
| 9,255,675 B1 | 2/2016 | Salzinger et al. | |
| 11,171,490 B2 | 11/2021 | Arditi et al. | |
| 2005/0016785 A1* | 1/2005 | Young | B60L 50/20 180/206.5 |
| 2013/0030603 A1* | 1/2013 | Hashimoto | B60L 15/00 701/1 |
| 2017/0085093 A1 | 3/2017 | Arditi | |
| 2020/0058812 A1* | 2/2020 | Zhou | H01L 31/0443 |
| 2020/0295569 A1* | 9/2020 | Arditi | H02J 3/46 |
| 2020/0398923 A1* | 12/2020 | Griffith | B62H 1/02 |

FOREIGN PATENT DOCUMENTS

| | | |
|---|---|---|
| CN | 102897279 | 1/2013 |
| CN | 108202802 A | 6/2015 |
| CN | 105539647 | 5/2016 |
| CN | 108791606 | 11/2018 |
| CN | 109874407 | 6/2019 |
| CN | 111038641 | 4/2020 |
| EP | 3196110 | 7/2017 |
| JP | H07267172 A | 10/1995 |
| JP | 2010521720 | 6/2010 |
| KR | 10-0866988 | 11/2008 |
| KR | 100866988 | 11/2008 |

(Continued)

OTHER PUBLICATIONS

Machine translation of KR-100866988-B1 (Year: 2022).*

*Primary Examiner* — David V Henze-Gongola

(57) ABSTRACT

A bicycle component includes a platform having a mounting arrangement adapted to be mounted to a bicycle. A solar cell array is arranged on the platform. A battery charging unit also is arranged on the platform and is operatively connected to the solar cell array.

5 Claims, 17 Drawing Sheets

(56) References Cited

FOREIGN PATENT DOCUMENTS

| KR | 100866988 B1 | * | 11/2008 | ............. H02S 30/10 |
|----|--------------|---|---------|--------------------------|
| KR | 20120132593  |   | 12/2012 |                          |
| NL | 2013273 B1   |   | 9/2016  |                          |
| TW | 201312959    |   | 3/2013  |                          |
| TW | M571618 U    |   | 12/2018 |                          |

* cited by examiner

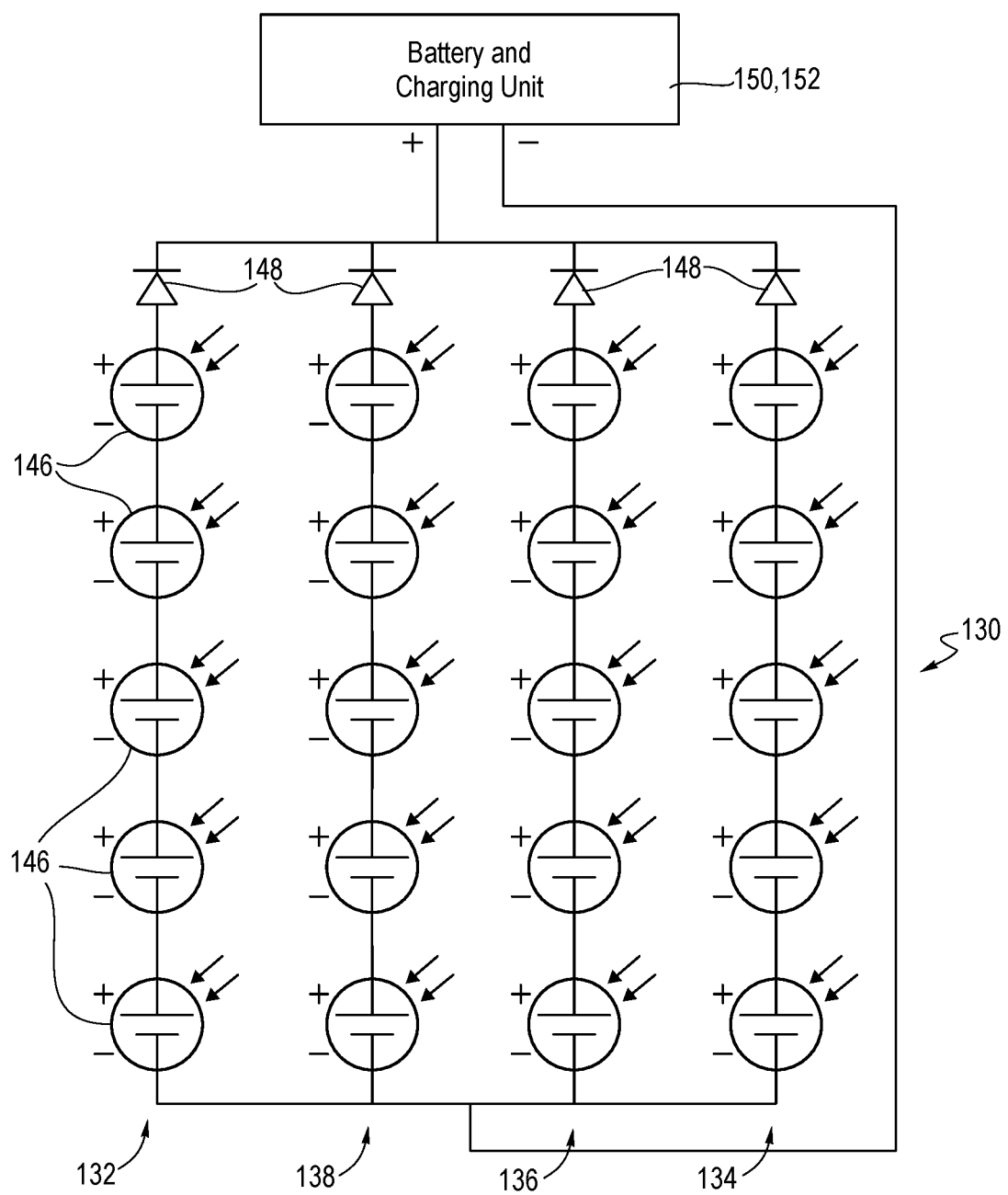

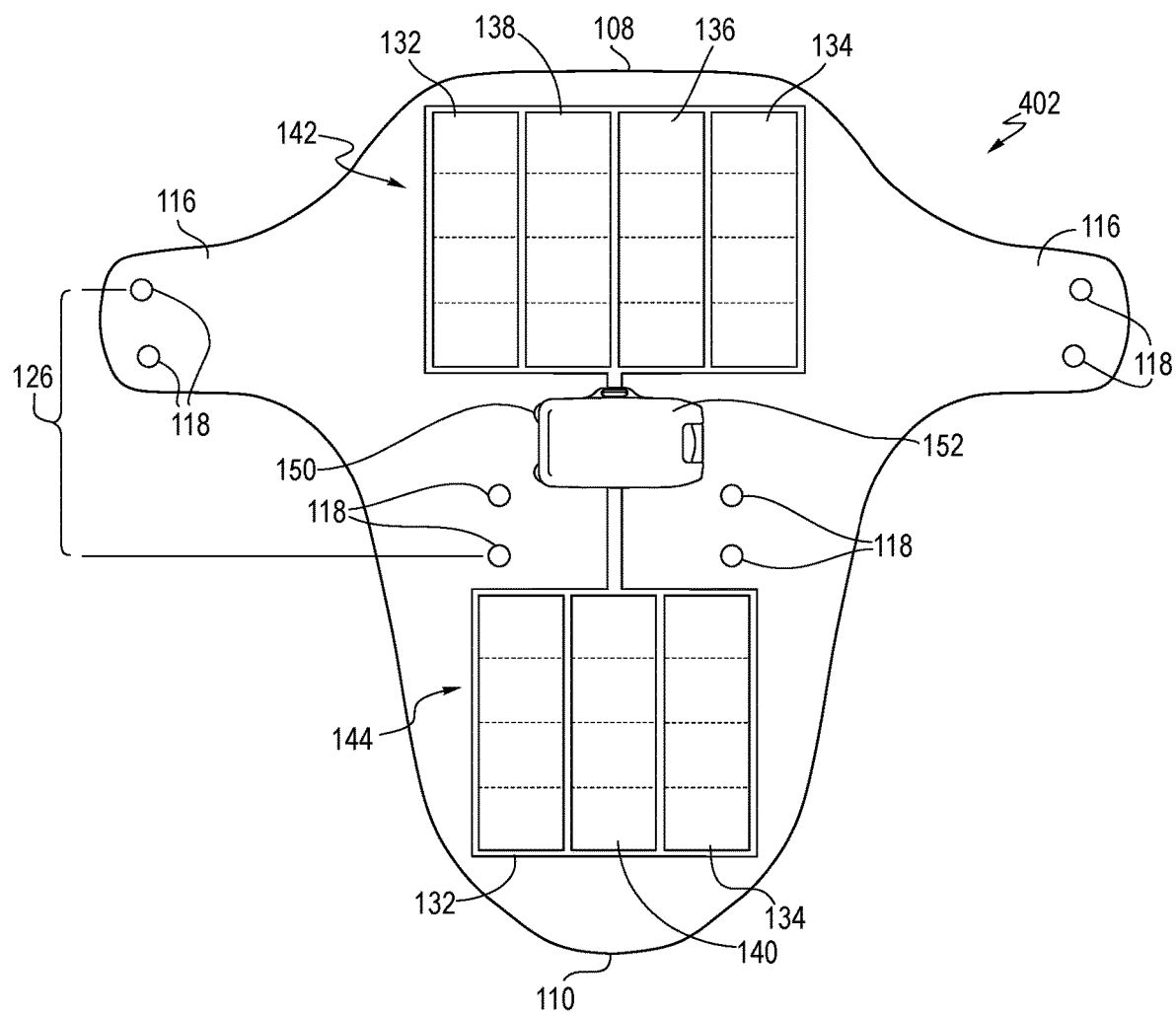

ENERGY HARVESTING FOR A BICYCLE

FIELD OF THE DISCLOSURE

The present application generally relates to a bicycle component incorporating an ambient energy harvesting system, for example a bicycle fender equipped with solar cells to charge a spare battery.

BACKGROUND

Modern bicycles are increasingly equipped with electronic components, such as shifters, derailleurs, power meters, and dropper posts. If the batteries supplying power to these components are not replaced or recharged, they run out of energy and the components cease to function. It may be inconvenient for some riders to have to monitor the state of the batteries and recharge them periodically.

For this reason, riders may choose to carry a spare battery when riding. However, even these spare batteries naturally discharge, as they provide power to a battery management system (BMS). There are also internal chemical reactions which further contribute to self-discharge. This means that a spare battery may not remain fully charged, even if never used.

SUMMARY

In one aspect, one embodiment of a bicycle component includes a platform having a mounting arrangement adapted to be mounted to a bicycle. A solar cell array is arranged on the platform. A battery charging unit also is arranged on the platform and is operatively connected to the solar cell array.

In one embodiment of the bicycle component, the platform has a centerline longitudinal axis and the solar cell array includes at least a first branch and a second branch, wherein the first and second branches are arranged on opposite sides of the longitudinal axis. Each of the first and second branches includes respective first and second pluralities of solar cells connected in series. The first and second branches are connected in parallel.

In another aspect, one embodiment of the bicycle component includes a battery charging unit having a capacitor operatively connected to the solar cell array, wherein the capacitor is operative to store energy transmitted from the solar cell array, and wherein the capacitor stores the energy at a first voltage. The battery charging unit also includes a boost converter operatively connected to the capacitor, wherein the boost converter is operative to step up the first voltage to a second voltage, a battery operatively connected to the boost converter, wherein the boost converter transmits power to the battery at the second voltage, and a microcontroller operatively connected to the capacitor and to the boost converter, wherein the microcontroller is operative to signal the boost converter to transmit the power to the battery, and wherein the microcontroller is operative to receive power from the capacitor.

In another aspect, one embodiment of a battery charging system for a bicycle includes a platform having a mounting arrangement adapted to be mounted to the bicycle and a solar cell array arranged on the platform. The solar cell array includes at least a first branch and a second branch connected in parallel, with each of the first and second branches having respective first and second pluralities of solar cells connected in series. The first and second branches have first and second lengths respectively, wherein the first and second lengths are less than or equal to 160 mm. A battery charging unit is arranged on the platform and is operatively connected to the first and second branches, wherein the battery charging unit is operative to transmit power to a battery at a voltage of between 6.0 and 8.4 volts.

The various embodiments of the bicycle component and battery charging system, and the methods for the use and assembly thereof, provide significant advantages over other bicycle components, charging devices, and methods. For example and without limitation, the bicycle component provides a space on the bicycle where a spare battery can be charged remotely, or untethered, and with the use of renewable energy, specifically solar energy. In this way, the system is able both to maintain a charge on a battery, and also charge a depleted battery, regardless of whether the bicycle is being used or not (e.g., is parked). For example and without limitation, in one embodiment various platforms such as bicycle fender(s), water bottle cages and panels may be equipped with an ambient energy harvesting system, such as solar cells. This allows the platform(s) to harvest energy from the sun and charge an energy storage device, such as a battery. Many riders already use such platforms. For example, fenders are used as a means of blocking water and mud that would otherwise be sprayed from the tires, while water bottle cages, and locations for holding a flexible panel, are common features on bicycles. As such, many bicycles may utilize one or more of the platforms without structural changes.

The foregoing paragraphs have been provided by way of general introduction, and are not intended to limit the scope of the claims presented below. The various preferred embodiments, together with further advantages, will be best understood by reference to the following detailed description taken in conjunction with the accompanying drawings.

BRIEF DESCRIPTION OF THE DRAWINGS

Objects, features, and advantages of the present invention will become apparent upon reading the following description in conjunction with the drawing figures, in which:

FIG. 4 is a solar cell circuit schematic.

FIG. 8 is a top view of another embodiment of a fender with an alternative configuration of charging components.

DETAILED DESCRIPTION OF THE DISCLOSURE

It should be understood that the term "plurality," as used herein, means two or more. The term "longitudinal," as used herein means of or relating to a length or lengthwise direction 2. The term "lateral," as used herein, means situated on, directed toward or running in a side-to-side direction. The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components. The terms "upper," "lower," "rear," "front," "fore," "aft," "vertical," "horizontal," "right," "left," "inboard," "outboard" and variations or derivatives thereof, refer to the orientations of an exemplary bicycle 50, shown in FIG. 1, from the perspective of a user seated thereon, for example with an "inboard" component or feature being closer to a vertical mid-plane, or longitudinal centerline 2, of the bicycle extending in a direction "A." The term "transverse" means non-parallel. The terms "outer" and "outwardly" refers to a direction or feature facing away from a centralized location, for example the phrases "radially outwardly," "radial direction" and/or derivatives thereof, refer to a feature diverging away from a centralized location. Conversely, the terms "inward" and "inwardly" refers to a direction facing toward the centralized or interior location. The term "subassembly" refers to an assembly of a plurality of components, with subassemblies capable of being further assembled into other subassemblies and/or a final assembly, such as the bicycle 50.

Figure 1:
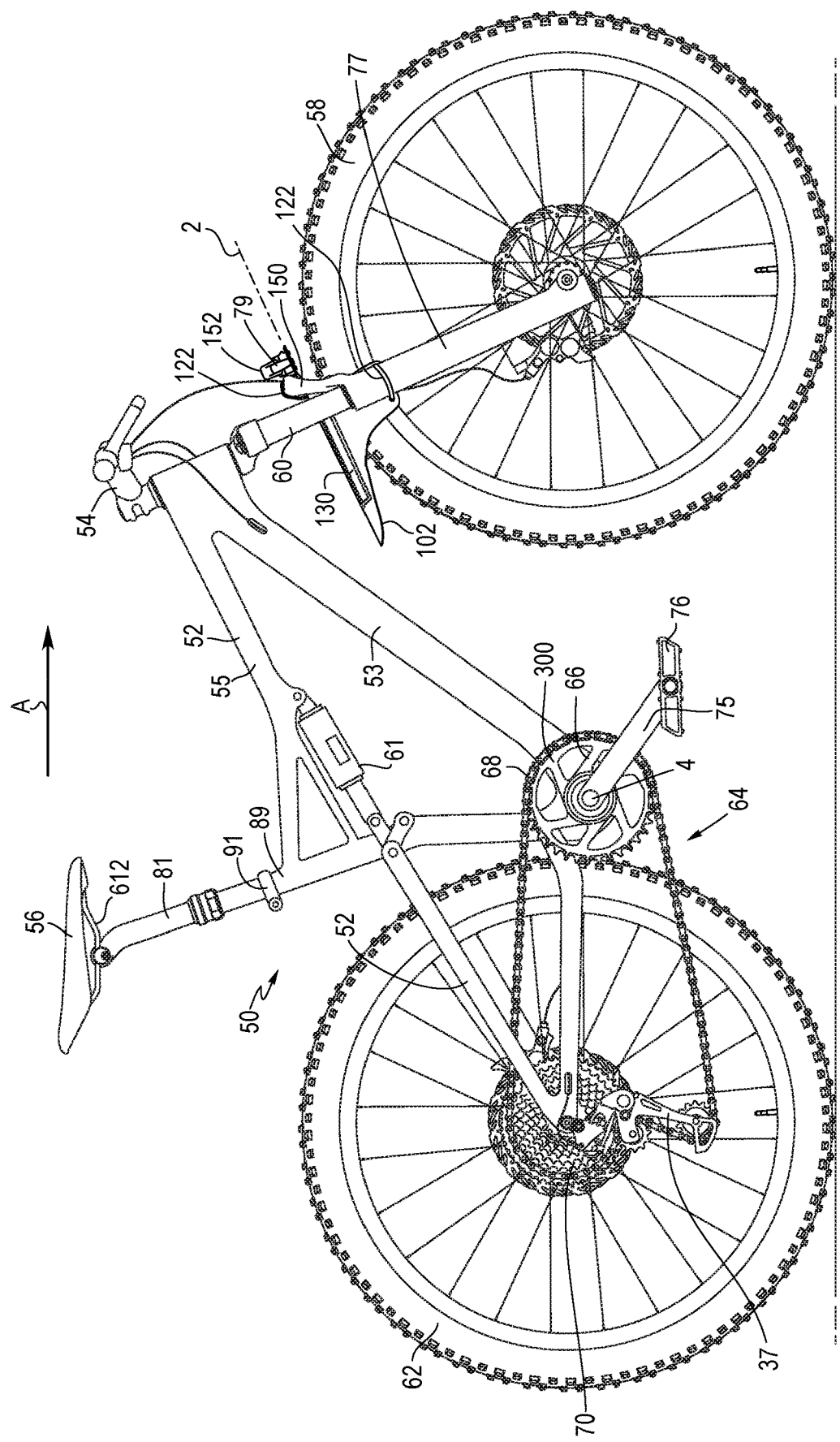
FIG. 1 is a side view of one example of a bicycle having a fender with charging components coupled thereto.

FIG. 1 illustrates one example of a human powered vehicle. In this example, the vehicle is one possible type of bicycle 50, such as a mountain bicycle. The bicycle 50 has a frame 52, handlebars 54 near a front end of the frame, and a seat or saddle 56 for supporting a rider over a top of the frame. The bicycle 50 also has a first or front wheel 58 carried by a front fork subassembly 60 supporting the front end of the frame. The bicycle 50 also has a second or rear wheel 62 supporting a rear end of the frame 52. The rear end of the frame 52 may be supported by a rear suspension component 61, such as a rear shock. The bicycle 50 also has a drive train 64 with a crank assembly 66 that is operatively coupled via a chain 68 to a rear cassette 70 or a driven sprocket assembly near the hub providing a rotation axis of the rear wheel 62. The crank assembly 66 includes at least one, and typically two, crank arms 75 and pedals 76, along with a chainring assembly 300 or a drive sprocket assembly. A crank spindle (not shown) may connect the two crank arms. The crank assembly may also include other components.

A rear gear change device 37, such as a derailleur, is disposed at the rear wheel 62 to move the chain 68 through different sprockets of the cassette 70. In one embodiment, a front gear changer device, such as a derailleur, may be provided to move the chain 68 through multiple sprockets of the chainring assembly. In the illustrated example, the saddle 56 is supported on a seat post 81 having an end portion received in a top of a frame seat tube 89 of the frame. A clamping ring 91 may be tightened to secure the upper seat tube 81 to the lower frame seat tube 89.

In FIG. 1, the arrow "A" depicts a normal riding or forward moving direction of the bicycle 50, and defines a longitudinal or lengthwise direction. While the bicycle 50 depicted in FIG. 1 is a mountain bicycle, various bicycle components and platforms 100, such as fenders 102, water bottle cages 202 and flexible panels 302, including the specific embodiments and examples disclosed herein as well as alternative embodiments and examples, may be implemented on other types of bicycles. For example and without limitation, the disclosed platforms may be used on road bicycles, as well as bicycles with mechanical (e.g., cable, hydraulic, pneumatic, etc.) and non-mechanical (e.g., wired, wireless) drive systems.

Figure 2:
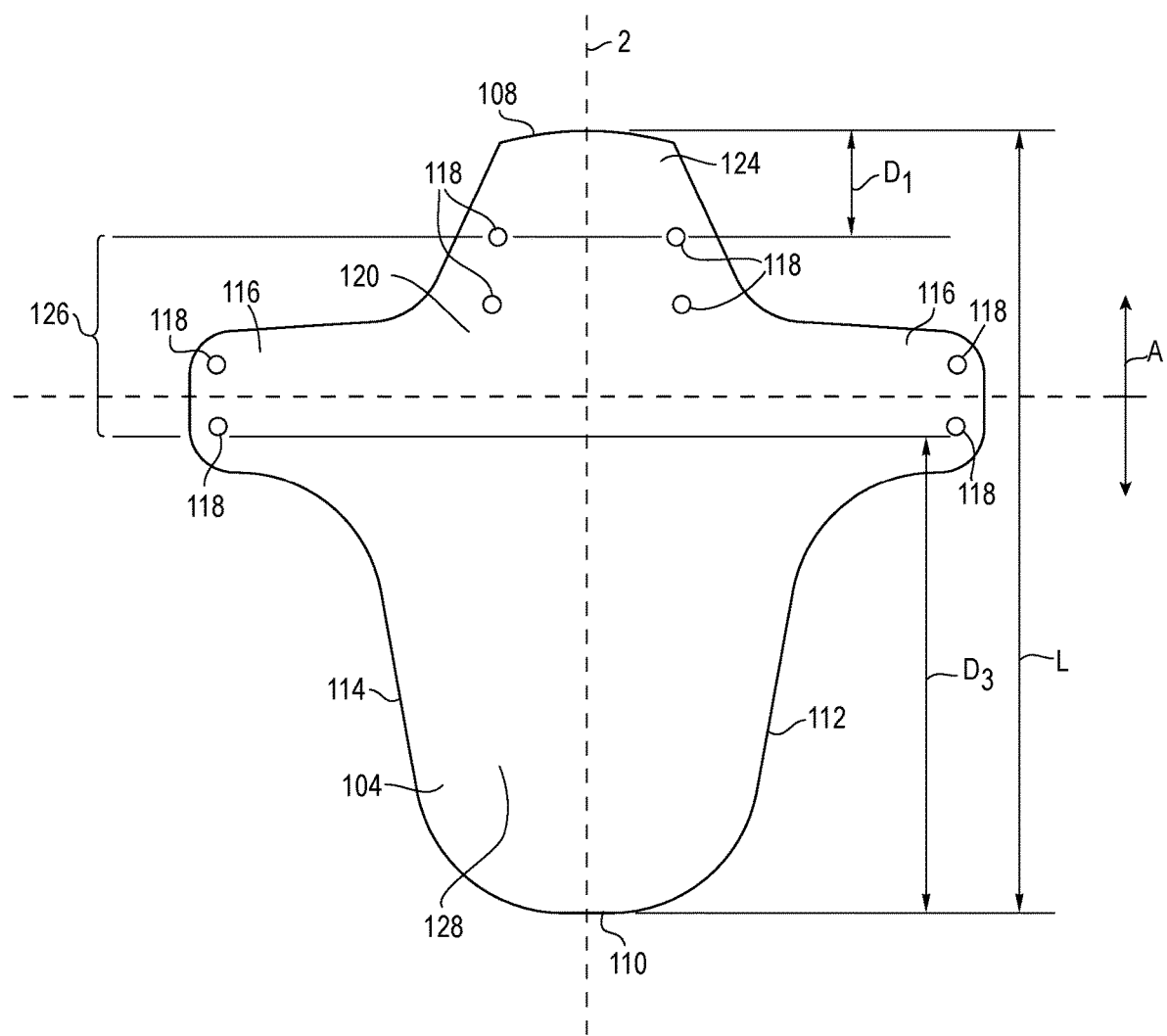
FIG. 2 is a top view of one embodiment of a fender without charging components.
Figure 5A:
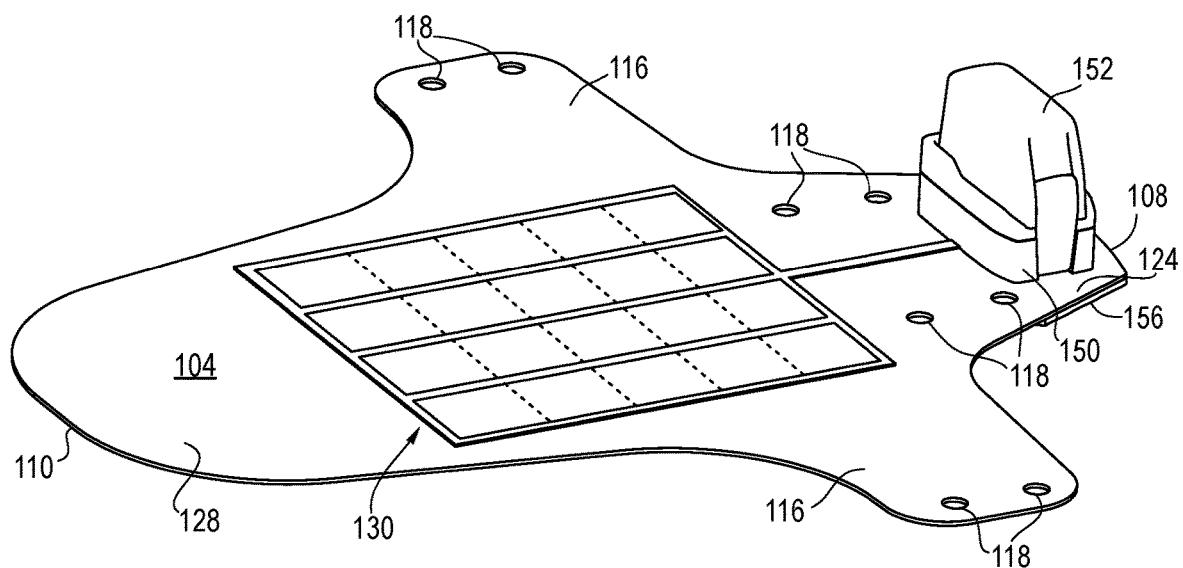
FIGS. 5A and B are top and bottom perspective views of the fender shown in FIG. 3.
Figure 5B:
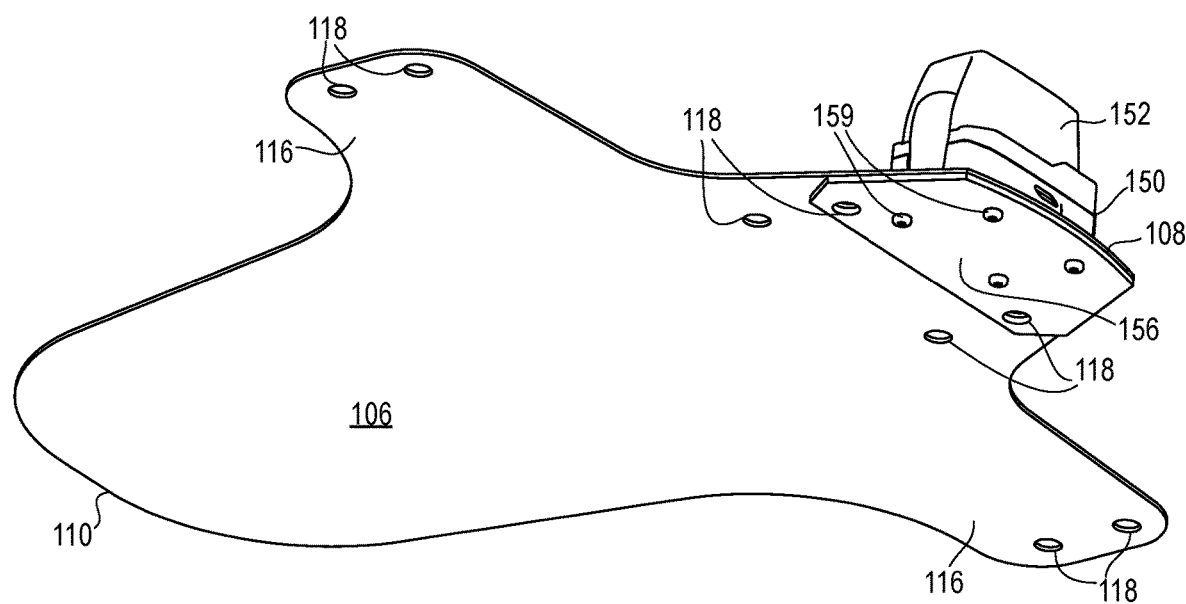
Figure 6:
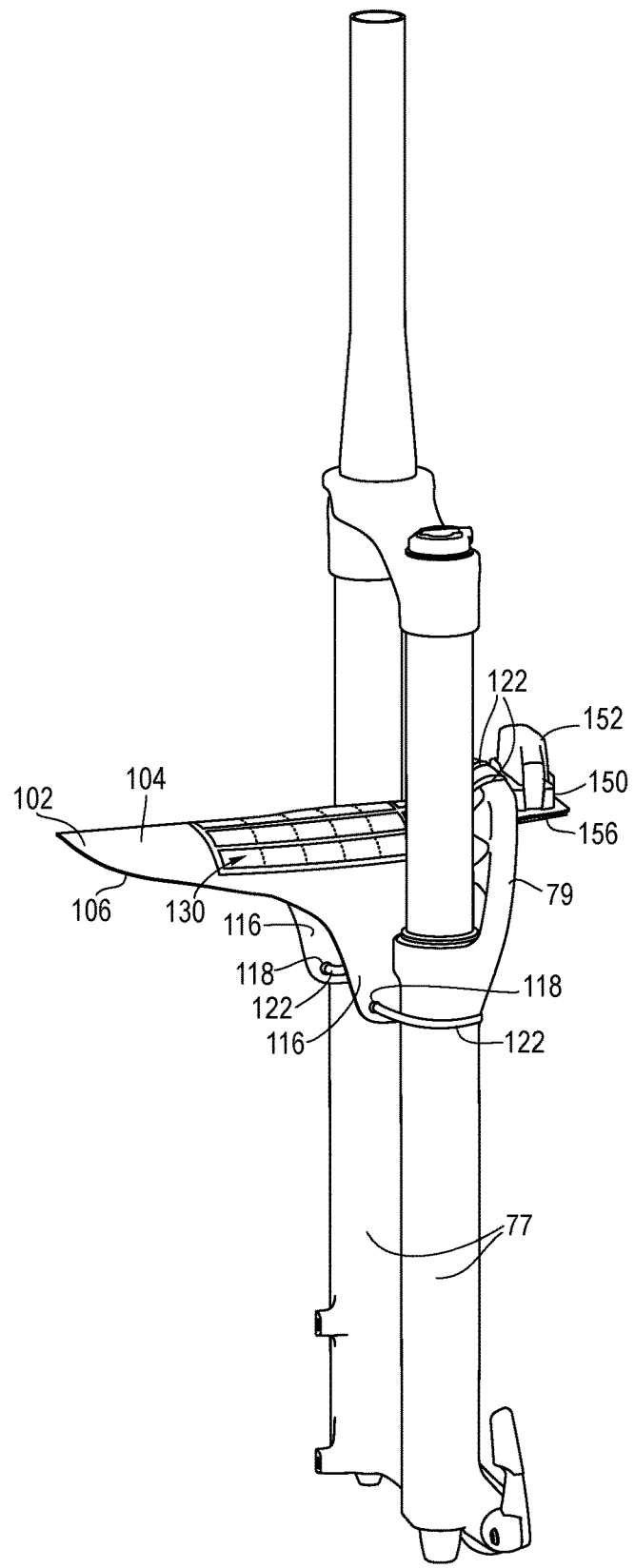
FIG. 6 is a rear perspective view of the fender shown in FIG. 3 installed on a bicycle front fork assembly.
Figure 7:
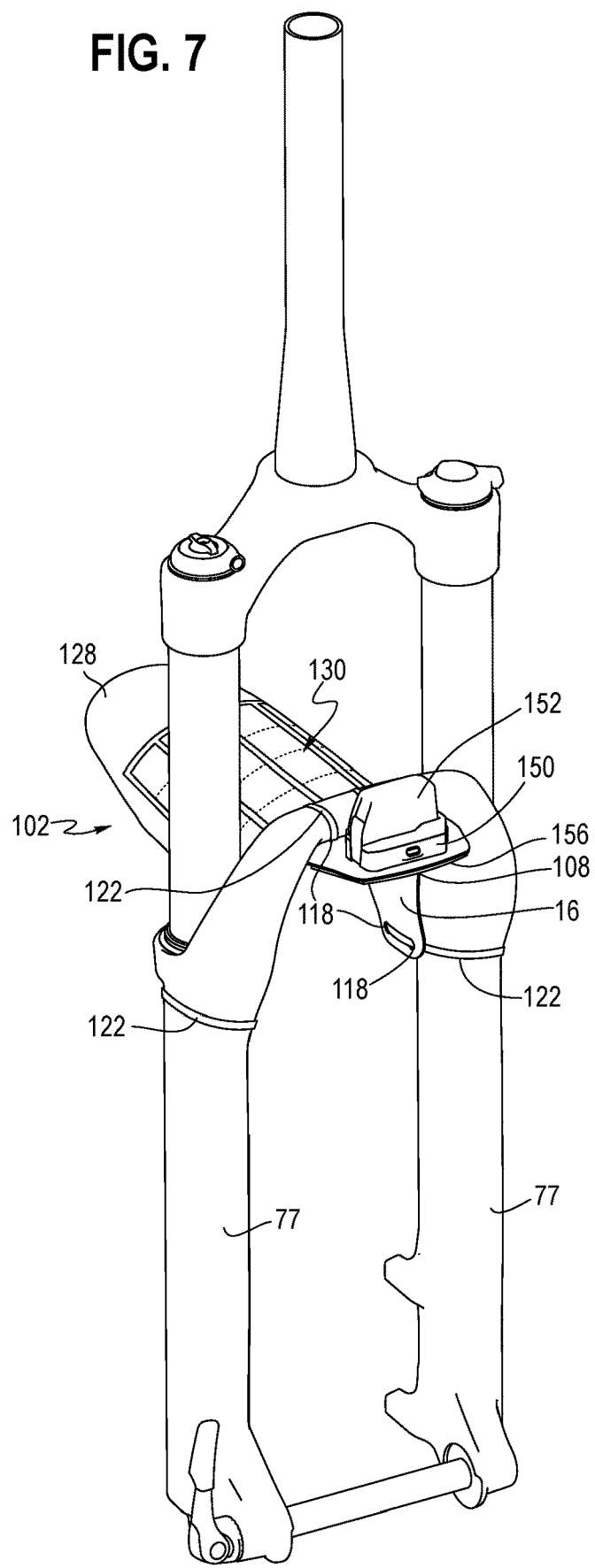
FIG. 7 is a front perspective view of the fender shown in FIG. 3 installed on a bicycle front fork assembly.

Now referring to FIGS. 1, 6 and 7, a bicycle component is shown as being mounted on the bicycle 50. In one embodiment, the component includes a platform 100 having a longitudinal centerline 2, which lies within a vertical plane. The term "platform" refers to a structure that defines at least one surface. In one embodiment, the platform surface flat, but may be planar or curved. The platform has a length "L" extending in the longitudinal direction 2 as shown for example in FIG. 2. In the embodiments of FIGS. 1-8, the platform 100 is configured as a fender 102 having an upper surface 104, a lower surface 106, a front edge 108, a rear edge 110 and opposite side edges 112, 114. It should be understood that at the term "fender" refers to any structure arranged or disposed adjacent a wheel and defining a surface that deflects water from the wheel when rotated, and includes mud flaps and fenders supported at one, two or more locations along the length of the fender. The fender 102 may be attached to the bicycle frame, front steering assembly and/or seat tube. The fender 102 may be made of a flexible material, such that it may configured as a flexible flat panel as shown in FIG. 2, which may be bent or elastically deformed into a curved shape, or installed configuration, as shown in FIGS. 1, 6 and 7. In one embodiment, the fender 102 is made of a flexible plastic material, e.g., polypropylene. The fender has a pair of side ears 116 or tabs that are oriented substantially vertically in the installed configuration and may be positioned inside the legs of a front steering system. The fender includes a mounting arrangement 118, shown as a plurality of openings or holes formed in the fender, with two pairs of two holes formed in the side ears 116 and four holes formed in a central support portion 120.

It should be understood that the phrase "mounting arrangement" refers to any feature that provides for a component to be secured (permanently or releasably) to another component or structures, and includes for example and without limitation one or more holes, fasteners, tabs, snaps, adhesive, welding, bonding, etc., or combinations thereof. As shown in FIGS. 1 and 6, fasteners 122, such as zip ties or similar straps or cords, may be used to secure the side ears 116 to right and left hand legs 77 or tubes of the front fork, while the four central openings may receive fasteners 122, such as bolts, screws or zip ties, to secure the fender to a bridge 79 connecting the tube, or to the crown or other part of the bicycle frame. A front portion 124 of the fender is cantilevered outwardly/forwardly from the support portion 126, with the front edge 108 located at a distance D1 from the forwardmost mounting arrangement holes 118 of the support portion 126. A rear portion 128 also is cantilevered outwardly/rearwardly from the support portion 126, with a rear edge 110 at a distance D2 from the rearwardmost mounting arrangement holes 118 of the support portion. The support portion 126 is defined between the forwardmost and rearwardmost mounting arrangement holes as shown in FIG. 2.

In a first embodiment of the fender 102, shown in FIGS. 1 and 3-6, a solar panel 130, otherwise referred to as a solar cell array, is arranged on the platform, and in particular on the upper surface 104 of the platform, including a portion of the central support portion 126 and the cantilevered rear portion 128. The solar cell array includes at least a first branch 132 and a second branch 134, wherein the first and second branches are arranged on opposite sides of the longitudinal axis. Each of the first and second branches includes respective first and second pluralities of solar cells 146 connected in series along each branch. Each cell or element has an output of 0.6 V. The first and second branches 132, 134 are connected in parallel. It should be understood that the array may include a plurality of branches, with two or more branches 134, 136, 132, 138 on each side of the axis, or a branch 140 centered on the centerline longitudinal axis 2, with at least one branch on each side of the axis 2 as shown in the embodiment of FIG. 8.

As shown in FIG. 8, the array may further include a front array and rear array 142, 144, each with a plurality of branches 132, 134, 136, 138, 140, all of which are connected in parallel. In one embodiment, the first and second branches 132, 134 have first and second lengths ($BL_1$ and $BL_2$ respectively), wherein the first and second lengths are less than or equal to 160 mm. The plurality of branches 132, 134, 136, 138, 140 may all have the same length in one embodiment, or the lengths of the branches may be different, for example if configured with a different number of cells in series. The branches 132, 134, 136, 138, 140 may also be defined in the terms of the number of cells arranged in the longitudinal direction, for example parallel to the longitudinal axis 2, wherein the first and second branches have first and second numbers of cells less than equal to 5. For example and without limitations, the branches 132, 134, 136, 138 are each shown with five cells connected in series.

Figure 3:
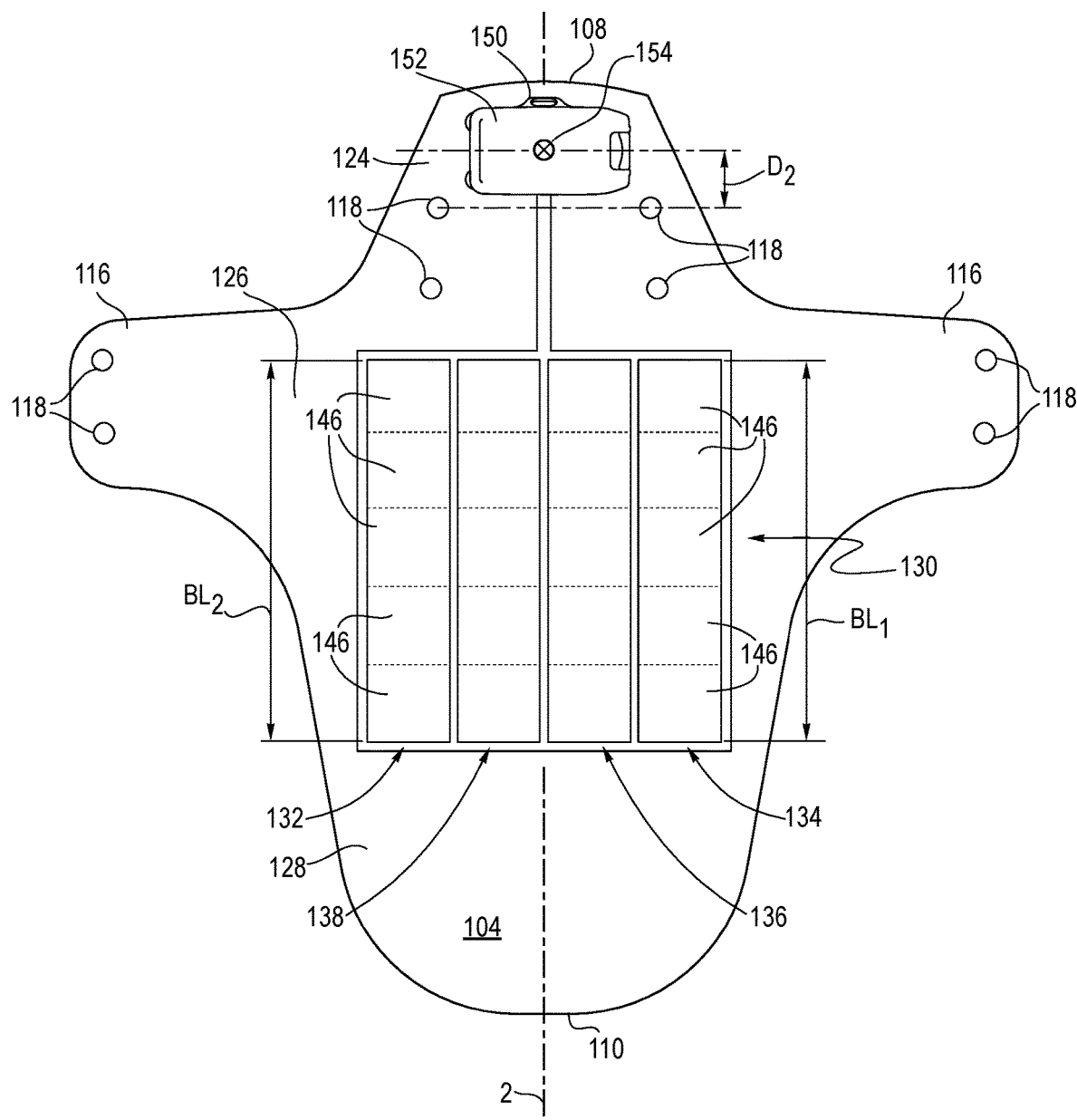
FIG. 3 is a top view of the fender shown in FIG. 2 with charging components coupled thereto.

Under certain lighting conditions, some portions of, or locations on, the solar cell array 130 may experience different levels of irradiation than others. For example, if light approaches from a right side of the fender, the left side will experience lower irradiation. Because the branches 132, 134, 136, 138 of solar cells are wired in parallel, and although one or more of the branches may be shaded, the power output of the unshaded branches remains the same. At the same time, if all of the cells 146 are wired in parallel, the open circuit voltage becomes equal to that of just one cell, which may be covered. Therefore, the solar cell array 130 includes a combination of series and parallel connections. As shown in FIG. 4, diodes 148 may be disposed at the end of each branch 132, 134, 136, 138 to prevent discharging into a branch that may be shaded or experiencing less irradiation. As shown in FIGS. 3 and 4, one embodiment of a solar cell array 130 includes four branches wired in parallel and oriented in the longitudinal direction, with each branch having five cells 146 wired in series. It should be understood that more or less branches, and more or less cells in each branch, may be suitable. By wiring the solar cells together in this way, the solar panel, or solar cell array 130, can output significant power even when light is distributed non-uniformly. For example, if light approaches from the right side, the leftmost branch 132 may have very little light exposure. The power output of the other three branches 138, 136, 134 may be relatively unaffected. The solar panel's power output will therefore be about 75% of what it would be with light exposed uniformly to all of the branches.

Referring to FIGS. 1, 3, 4 and 6, a battery charging unit 150 and battery 152 are also arranged on the platform 102 and are operatively (e.g., electrically) connected to the branches 132, 134, 136, 138. The phrase "operatively connected" refer to two or more components or features being connected, mechanically or electrically, such that the two or more components may function, work and/or communicate with each other. The battery 152 and charging unit 150 are located on the front cantilevered portion 124 of the platform, near the forwardmost mounting arrangement 118. The battery 152 is releasably connected to the battery charging unit 150, for example by way of a snap fit or with releasable tabs, such that the battery may be removed from the battery charging unit, or a new battery may be operatively (e.g., mechanically and electrically) connected with the battery charging unit. In one embodiment, the center of gravity 154 of the charging unit 150 and battery 152 are located a distance D2 from the location of the forwardmost mounting arrangement holes 118, with D2 preferably being 60 mm or less. The close proximity of the charging unit 150 and battery 152 to the mounting arrangement 118, which is anchored to a support structure such as a frame or steering unit, helps to minimize the moment arm (D2) applied by the charging unit 150 and battery 152, and therefore the moment that the weight of the charging unit and the battery apply to the fender. The close proximity of the charging unit 150 and battery 152 relative to the support location, or mounting arrangement 118, ensures that the fender may support that weight of the battery without significant deformation or failure, and also helps dampen any associated vibrations, for example during riding conditions. A reinforcement plate 156, or stiffener, made for example of metal (e.g., steel), may be installed on the bottom surface 106 of the panel to provide additional strength and stability at the front cantilevered portion. In one embodiment, the reinforcement plate 156 extends under the forward portion supporting the battery charging unit, and also under at least a portion of the mounting arrangement 118, and at least a portion of the support portion 120, including for example overlapping at least some of the mounting arrangement holes 118. Other stiffeners, such as ribs, may be incorporated into the panel or plate. As shown in FIG. 5B, the battery charging unit may be secured to the reinforcement plate 156, for example with fasteners 159 such as rivets, screws, etc., with the reinforcement plate thereby bridging between the charging unit and mounting arrangement.

Figure 13:
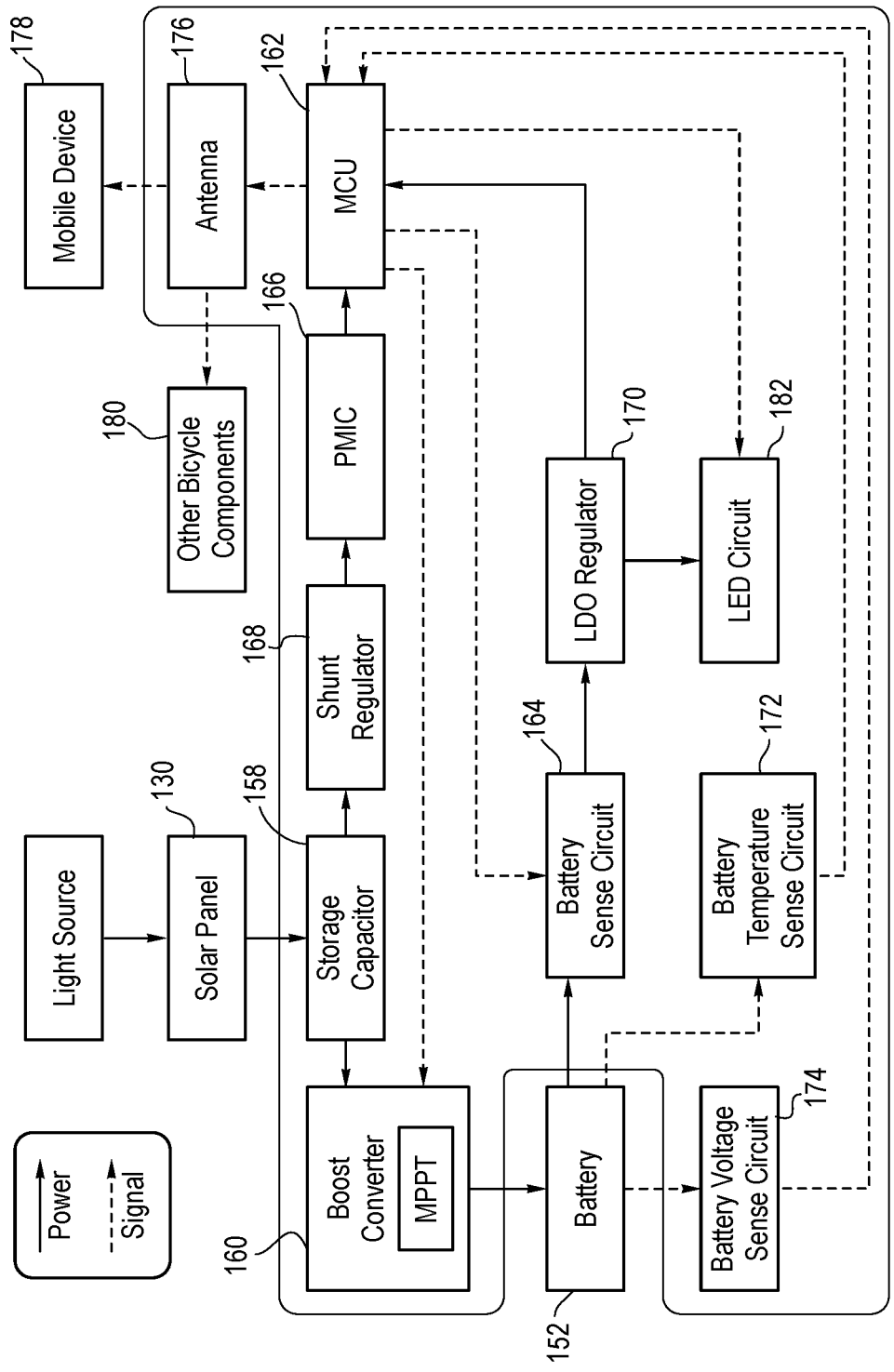
FIG. 13 is a system block diagram.

In one embodiment of the bicycle component, and referring to FIG. 13, the battery charging unit 150 includes a capacitor 158 operatively connected to the solar cell array 130, wherein the capacitor is operative to store energy transmitted from the solar cell array, and wherein the capacitor stores the energy at a first voltage, for example 1.8V→3.6V. The battery charging unit 150 also includes a boost converter 160 operatively connected to the capacitor, wherein the boost converter is operative to step up the first voltage to a second voltage. The battery 152 is operatively connected to the boost converter, wherein the boost converter 160 transmits power to the battery at the second voltage, and a microcontroller unit (MCU) 162 operatively connected to the capacitor and to the boost converter, wherein the microcontroller is operative to signal the boost converter to transmit the power to the battery, and wherein the microcontroller is operative to receive power from the capacitor. In one embodiment, the battery charging unit 150 is operative to transmit power to the battery 152 at a voltage of between 6.0 and 8.4 volts. The battery charging unit also includes a battery sensor circuit 164 operatively connected between the battery and the microcontroller, wherein the battery sensor circuit is operative to enable power transfer from the battery to the microcontroller. The battery charging unit also includes a power management integrated circuit (PMIC) 166 operatively connected between the capacitor and microcontroller, wherein the PMIC is operative to allow power flow from the capacitor to the microcontroller when the first voltage exceeds a first predetermined value, and wherein the PMIC is operative to stop power flow from the microcontroller when the first voltage drops below a second predetermined value. The boost converter is operative to receive a signal from the microcontroller to perform maximum power point tracking, wherein the first voltage is compared to a predetermined maximum power point voltage and optimizes the power transmitted to the battery at the second voltage.

The battery charging unit circuitry and components illustrated in FIG. 13 demonstrate how power and electrical signals are exchanged between components in one embodiment. The solar panel 130, or solar cell array, harvests energy from the sun or other light sources. It converts the light into electricity by way of a photovoltaic effect. The electrical power generated by the solar panel 130, or solar cell array, is sent or transmitted to the capacitor 158, which stores energy. Power then passes from the capacitor to the boost converter 160. When a battery is being charged, the boost converter steps up the voltage to match the charging voltage of the battery. The power is then transmitted to the battery to charge the battery.

Figure 15:
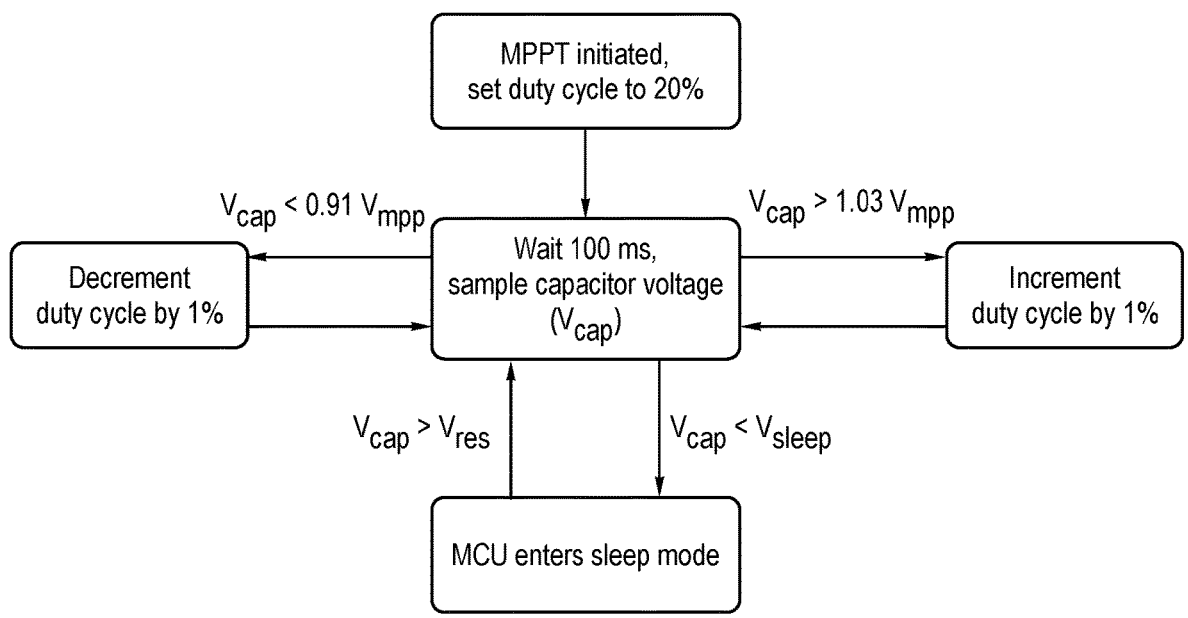
FIG. 15 is a flow chart showing an exemplary MPPT algorithm.

The amount of power extracted from the solar panel 130 is not dependent exclusively on the amount of solar irradiation. The amount of power may also be a function of the load, i.e., the part of the circuit consuming the power. In order to maximize power from the solar cell array, the system in one embodiment is capable of controlling some characteristic of the load. The process of tuning the load characteristic to maximize power is referred to as maximum power point tracking (MPPT). In one embodiment, MPPT is performed by the boost converter 160, which receives an electrical signal from the MCU 162. The duty cycle of the signal is incrementally adjusted by the MCU according to an algorithm, which is configured to narrow in on the condition where power is maximized. An example of such an algorithm is shown in FIG. 15. The MPPT algorithm is designed to maintain the cells at 3V+−100 mV, with a Boost Input: 3V+/−0.100 V (MTTP algorithm), and a Boost Output: 6-8.4 V (battery charging).

Figure 16:
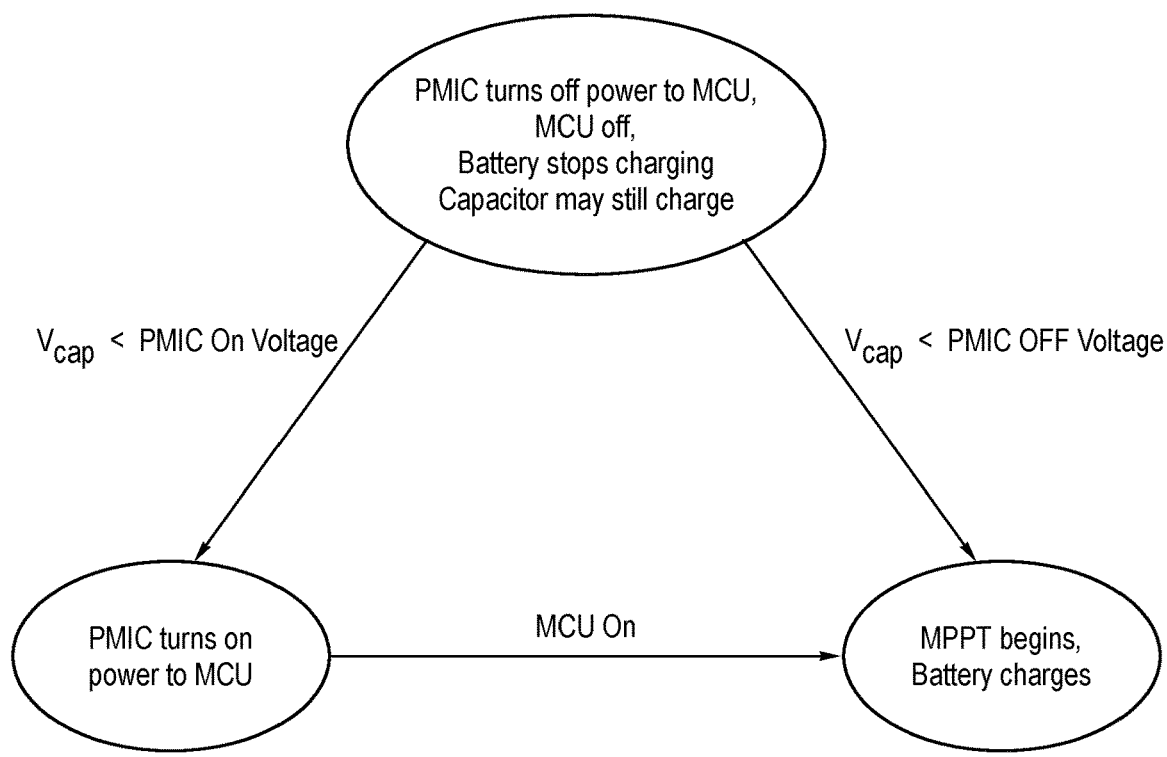
FIG. 16 is a flow chart showing an exemplary PMIC behavior.

The MCU 162 is responsible for controlling many of the operations of the system. In order to perform such operations, the MCU must have a power source. With one exception, described below, the power comes from the storage capacitor 158. The power leaves the storage capacitor and passes through a shunt regulator 168. The shunt regulator 168 prevents the storage capacitor 158 from reaching excessive voltages that might damage the MCU 162. In other embodiments, the shunt regulator may be omitted. Power flows from the shunt regulator to the power management integrated circuit (PMIC) 166. The PMIC allows power flow to the MCU anytime the voltage of the storage capacitor exceeds a certain value as shown in FIG. 16. The PMIC stops power flow to the MCU anytime the voltage of the storage capacitor has dropped below a certain value. In this way, the PMIC 166 and MCU 162 allow for charging in low light conditions.

As described above, the power for the MCU typically comes from the storage capacitor. In certain situations, however, the MCU may be powered by the battery 152 connected to the charging unit 150. This situation may occur when a battery with non-zero charge is connected to the system. The connection is detected by the battery sense circuit 164, which enables power flow from the battery to the MCU. As shown in FIG. 13, the power passes through a low dropout regulator (LDO) 170 before entering the MCU. The LDO regulates the voltage applied to the MCU, protecting it from damage. Once the power has reached the MCU, the MCU turns on and performs several start-up operations.

The MCU 162 receives electrical signals from multiple parts of the circuit. A battery voltage sense circuit 174 sends a signal to the MCU for identifying the charge state of the battery. A battery temperature sense circuit 172 sends a signal to the MCU for identifying when the battery is at risk of overheating. The battery sense circuit 164 sends a signal to the MCU for identifying when a battery is connected. The MCU may also send electrical signals to multiple parts of the circuit. As described above, one signal is sent to the boost converter to control MPPT. Another signal is sent from an antenna 176 for wireless communication with mobile devices 178 and/or other electronic bike componentry 180. Lastly, a signal may be sent to an LED circuit 182 to indicate the state of charge of a newly connected battery. The LED(s) in this circuit receive power from the battery 152, through the LDO regulator.

Figure 14:
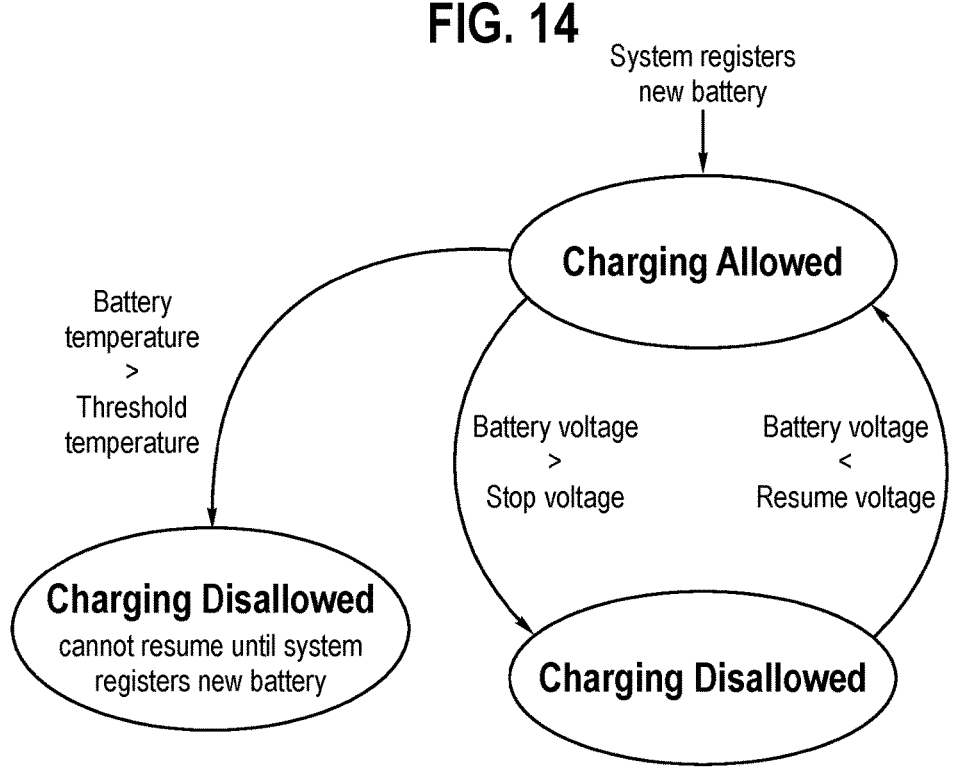
FIG. 14 is a flow chart showing a charge hysteresis cycle.
Figure 17:
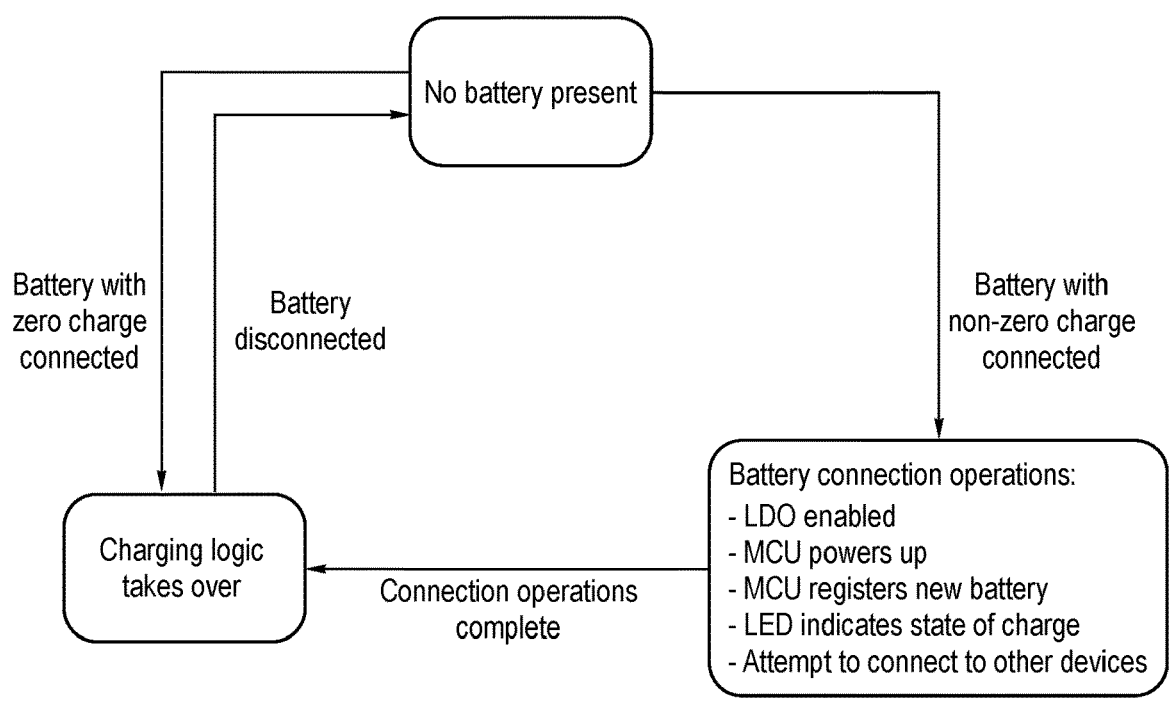
FIG. 17 is a flow chart showing exemplary battery connection states.

FIG. 17 shows the possible states that the system may enter upon connection of a battery 152. If the connected battery has zero charge, the system begins operating according to its built-in charging logic. On the other hand, if the connected battery stores a non-zero charge, the system may perform a series of connection operations. First, and with reference to FIG. 13, the LDO regulator 170 is enabled, so that power can flow from the battery 152 to the MCU 162. Once the MCU powers up, it registers a new battery. This means that the charge hysteresis cycle, shown in FIG. 14, is reset. Next, the MCU 162 activates the LED circuit 182 to indicate state of charge. The MCU 162 may also attempt to connect to other devices 178, 180 via the antenna 176. This may include mobile devices 178 and other bicycle componentry 180. Once these battery connection operations have been completed, the charging logic takes over. If the battery is disconnected at any point, the charging logic ceases.

Referring to FIG. 14, charging is allowed by default whenever the system registers a new battery. The battery continues to charge until it surpasses a designated voltage, referred to as the "stop voltage". At this point, charging is disallowed. When the battery discharges to a point below the designated "resume voltage", the system again allows charging. The stop and resume voltages should be spaced sufficiently apart (i.e. 8.4V and 7.8V, respectively). Otherwise, the battery undergoes an excessive number of short charge cycles. This leads to significant energy losses, due to the chemical hysteresis effect. If at some point, the temperature of the battery exceeds a designated threshold, charging is disallowed to protect the battery. In this case, charging cannot resume until the system has registered a new battery.

FIG. 15 illustrates an exemplary MPPT algorithm that may be utilized in this system. The duty cycle refers to that of the signal sent from the MCU to the boost converter, with the duty cycle initially set to 20%. After every 100 ms, the system samples the voltage across the storage capacitor, denoted by $V_{cap}$. $V_{cap}$ is then compared to the voltage at which maximum power point is achieved, denoted by $V_{mpp}$. If $V_{cap}$ is not within a tolerable range of $V_{mpp}$, the duty cycle is shifted by 1% in the appropriate direction. The system targets a $V_{cap}$ that is within 3% of $V_{mpp}$, although other tolerances may be used. Within certain ranges of solar irradiation, $V_{mpp}$ can be treated as a constant, without major sacrifices to accuracy. However, it is possible to use more generalized MPPT algorithms that account for the dependence of $V_{mpp}$ on solar irradiation. The MCU may also enter a sleep mode in low light conditions. This occurs when $V_{cap}$ drops below a designated sleep threshold, $V_{sleep}$. In sleep mode, the MCU remains on, but ceases to perform its normal operations. This blocks the flow of power to the battery, so that the storage capacitor can charge in low light. Only once $V_{cap}$ has risen above the resume threshold, $V_{res}$, will the MPPT algorithm continue.

Referring to FIG. 16, the PMIC 166 has both an ON voltage and an OFF voltage. Whenever $V_{cap}$ exceeds the ON voltage, the PMIC turns on power to the MCU. As a result, the MCU powers up, begins the MPPT algorithm and charges the battery. Whenever $V_{cap}$ drops below the OFF voltage, the PMIC 166 turns off power to the MCU 162. As a result, the MCU shuts off and the battery stops charging. The capacitor, however, may continue charging.

Figure 18A:
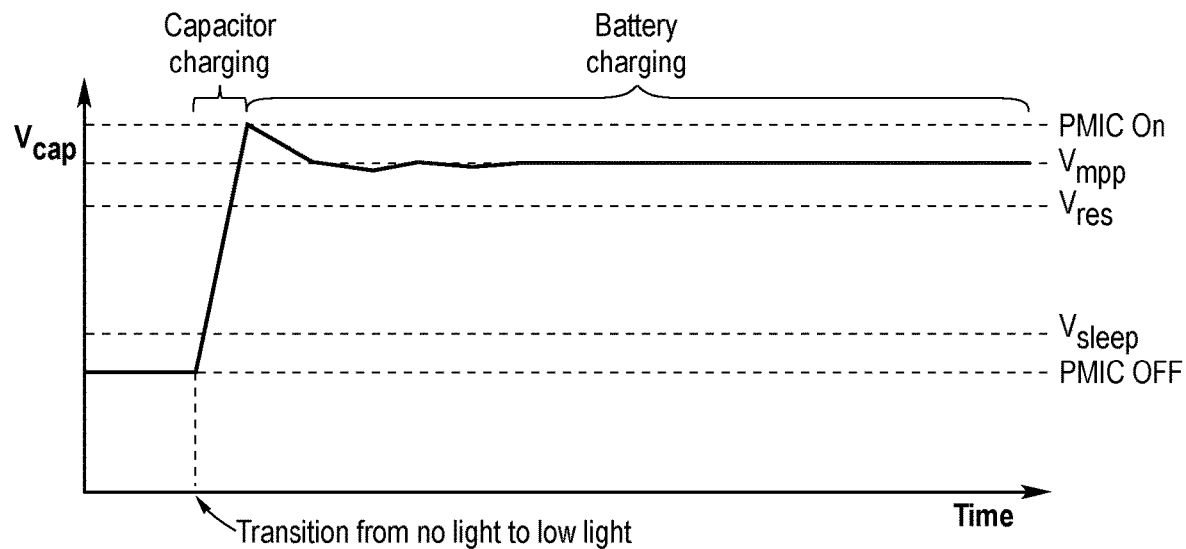
FIGS. 18A-C are graphs illustrating capacitor voltages over time when exposed to high light, moderate light and low light respectively.
Figure 18B:
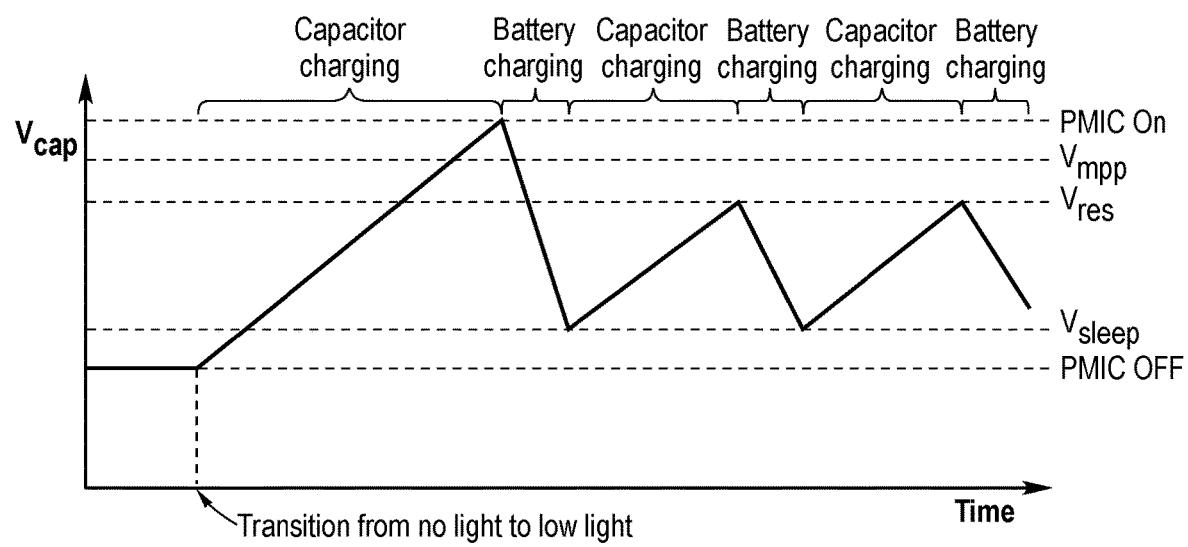
Figure 18C:
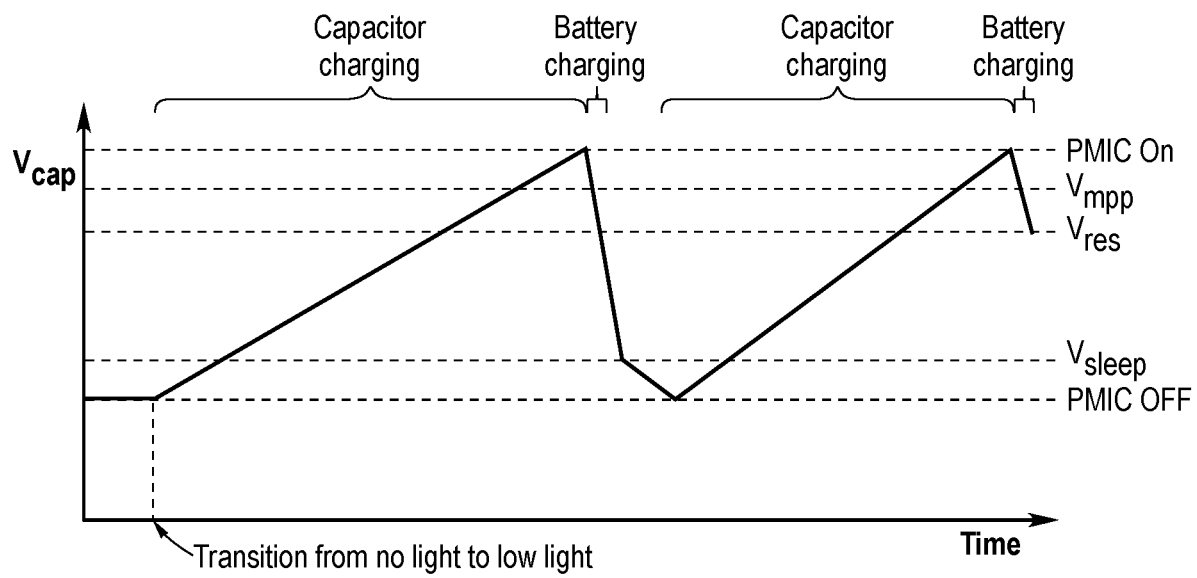

FIGS. 18A-C show the combined effects of the MPPT algorithm and PMIC behavior in different lighting conditions. "High light" refers to when there is enough solar power to continuously charge the battery 152 and power the MCU 162. "Moderate light" refers to when there is not enough solar power to continuously charge the battery 152, but there is enough to keep the MCU 162 in sleep mode. "Low light" refers to when there is not enough solar power to keep the MCU 162 in sleep mode. Each of these figures illustrates how $V_{cap}$ changes over time, upon transitioning from no light to the associated light condition. Note that these are simplified representations of system behavior. They are not plotted to scale, and $V_{cap}$ is shown to change linearly, even if that is not the case.

Referring to FIGS. 13 and 18A, the capacitor 158 begins charging upon transitioning to high light. Once $V_{cap}$ reaches the PMIC ON voltage, power flows to the MCU 162 and turns the MCU on. The MCU sends a signal to, and activates, the boost converter 160 and the battery begins charging. The MPPT algorithm causes $V_{cap}$ to stabilize near $V_{mpp}$. Because there is a lot of light, the capacitor is able to maintain its voltage.

Referring to FIG. 18B, the capacitor 158 begins charging upon transitioning to moderate light, but at a slower rate than in FIG. 8.1. Once $V_{cap}$ reaches the PMIC ON voltage, power flows to the MCU 162 and turns it on. The MCU sends a signal to, and activates, the boost converter 160 and the battery begins charging. However, because there is not a lot of light, the capacitor 158 cannot maintain its voltage. $V_{cap}$ falls until it reaches $V_{sleep}$, at which point the MCU 162 enters sleep mode and battery charging stops. The solar array 130 is still harvesting more than enough power to keep the MCU in sleep mode, and so the capacitor 158 charges once again. Battery charging resumes once $V_{cap}$ reaches $V_{res}$ and the cycle continues.

Referring to FIG. 18C, the capacitor 158 begins charging upon transitioning to low light, but at an even slower rate than shown in FIG. 18B. Once $V_{cap}$ reaches the PMIC ON voltage, power flows to the MCU 162 and turns it on. The MCU activates the boost converter 160 and the battery begins charging. However, because there is not a lot of light, the capacitor 158 cannot maintain its voltage. $V_{cap}$ falls until it reaches $V_{sleep}$, at which point the MCU 162 enters sleep mode and battery 152 charging stops. The light is so low that there is not enough power to keep the MCU in sleep mode, and so $V_{cap}$ continues to fall until reaching PMIC OFF. At this point, the MCU 162 turns off. There is now no load on the capacitor, so it is able to charge back up to the PMIC ON voltage. The cycle continues.

Although the platform is shown in FIGS. 1-6 as being configured as a front fender 102 connected to a bridge 79, the platform may be configured as other structures, including other fenders. For example in FIG. 8, the platform is configured as a front fender 402 for mounting on a "reverse fork," where the bridge or arch is positioned behind the lower legs, rather than in front of the legs. Therefore, this embodiment has the central mounting holes positioned further back and longitudinally behind the side mounting holes. Solar cell arrays 144, 142 may be placed both behind and in front of the battery charger to make optimal use of the space. In this embodiment, the battery charger and battery are mounted entirely on the support portion 126 between the forwardmost and rearwardmost mounting arrangement openings.

Figure 9A:
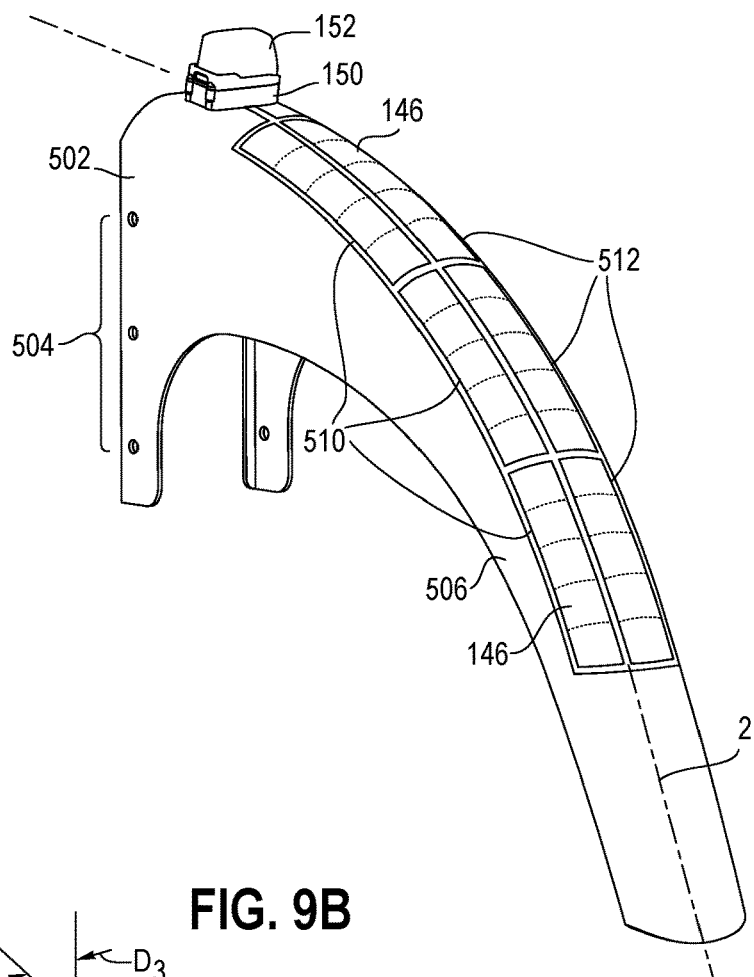
FIGS. 9A and B are rear and front perspective views of another embodiment of a fender with charging components coupled thereto.
Figure 9B:
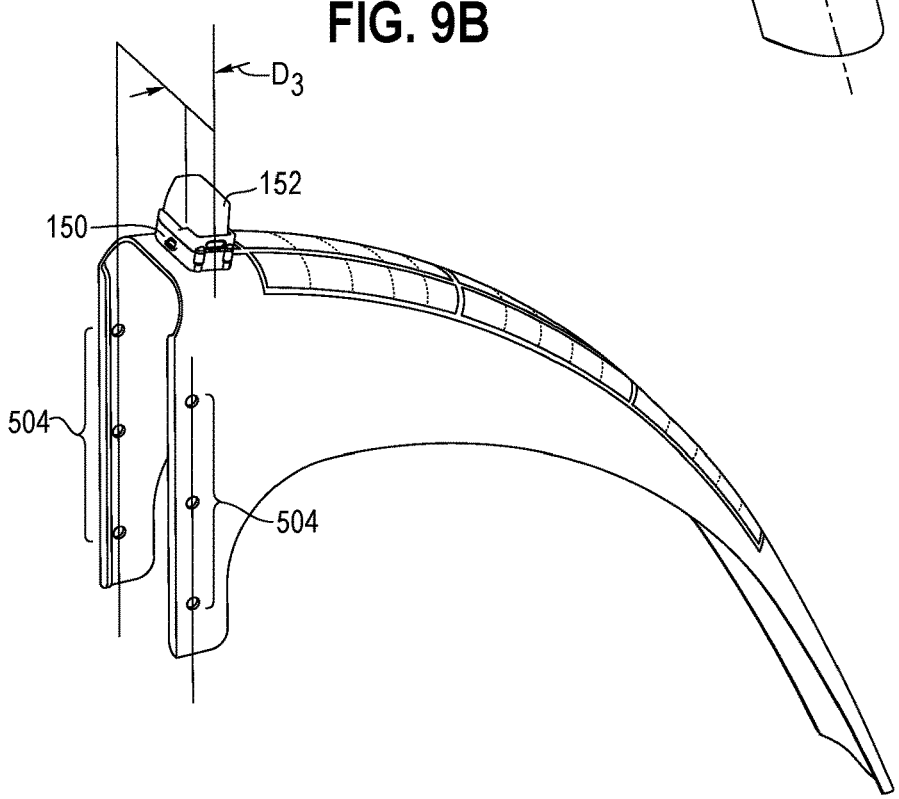

FIGS. 9A and B show a platform configured as a rear fender 502 having a mounting arrangement 504 positioned along a front edge of a pair of side walls. In one embodiment, the mounting arrangement 504 is configured as a plurality of vertically spaced openings, which may be engaged by fasteners such as zip ties or screws. The fender has a curved cantilevered portion 506, which curves downwardly and rearwardly along a longitudinal direction, and downwardly along a lateral direction. The battery charging unit 150, or center of gravity thereof, is positioned a distance D3 from the plane of the mounting arrangement 504. The solar cell array 130 includes three branches 510, 512 on each side of the longitudinal centerline 2, with each branch 510, 512 configured with five solar cells 146 connected in series along each branch, and with the six branches 510, 512 being connected in parallel.

Figure 10B:
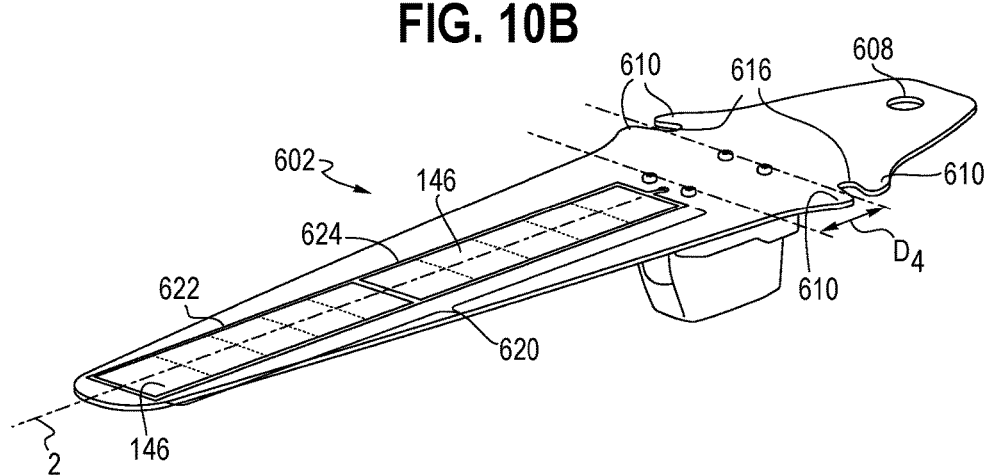
FIGS. 10A-C are a perspective assembly view, perspective view and top view of an alternative embodiment of a fender with charging components coupled thereto.
Figure 10A:
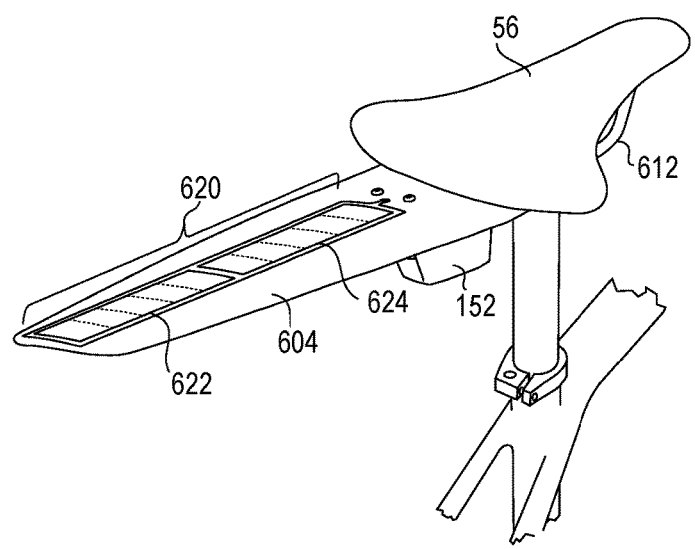
Figure 10C:
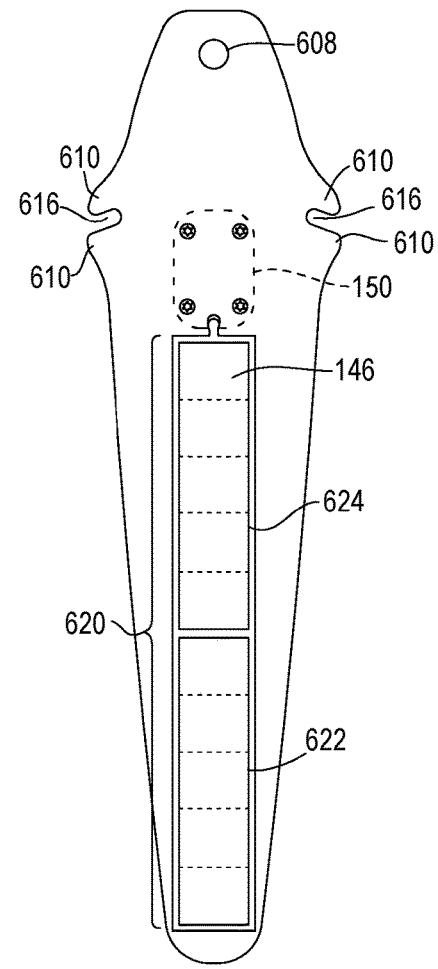

FIGS. 10A-C show a platform configured as a rear fender 602 or mudguard, which extends rearwardly from beneath the saddle 56. In this embodiment, the platform is flat, or has slightly curved side edges 604. A mounting arrangement 606 includes a central opening 608 secured to the seat post and a pair of side ears 610 or flaps defining a groove 616 or notch that is disposed on and secured to rails 612 of the saddle with fasteners, for example zip ties. The fender is cantilevered rearwardly along the longitudinal axis 2. The battery charging unit 150, or center of gravity thereof, is positioned a distance D4 from the reawardmost mounting arrangement, configured in this embodiment as grooves 616. The solar cell array 620 includes two centrally located branches 622, 624 centered on the longitudinal centerline, each configured with five solar cells 146 connected in series, with the two branches 622, 624 being connected in parallel.

Figure 11A:
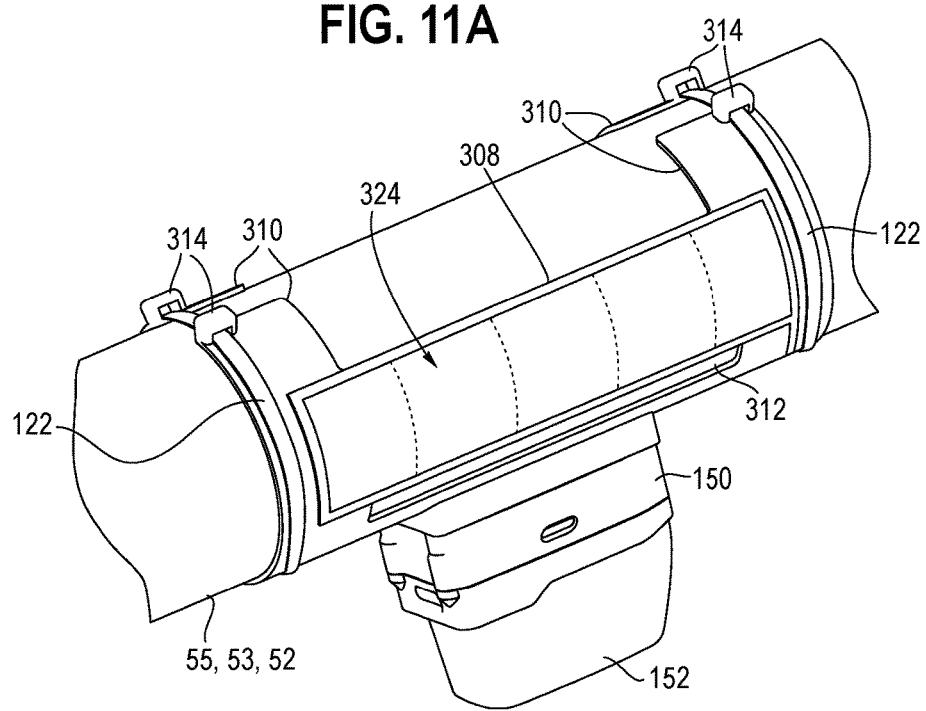
FIGS. 11A-C are perspective assembly, top and bottom views of a flexible panel with charging components coupled thereto.
Figure 11B:
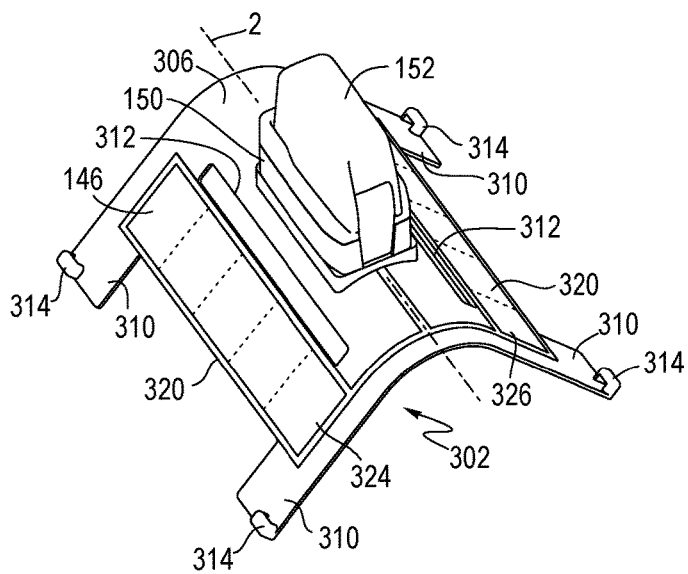
Figure 11C:
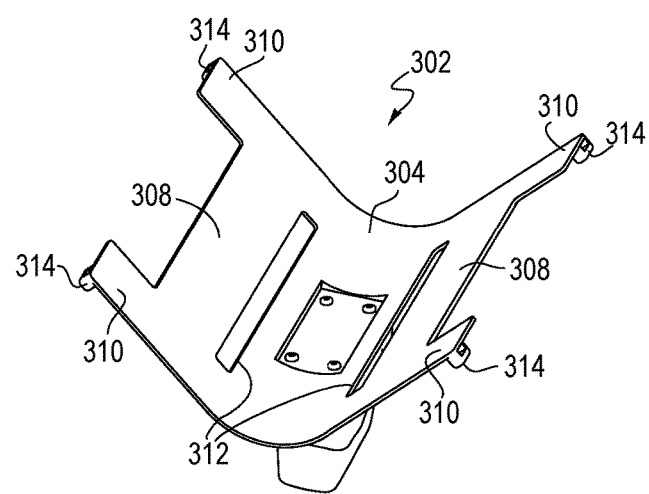

Referring to FIGS. 11A-C, a platform is configured as a flexible panel 302 that may be deformed or wrapped around a bicycle frame, for example a top tube 55 or down tube 53 of the frame 52. The panel has central panel 304 with an outer surface 306 defining exposed side regions 308 each having a solar cell array, with slots 312 separating the side regions 308 from the central panel 304. The panel includes two pairs of ears 310 or tabs with mounting arrangements 314, configured as eyelets, which are positioned to receive a zip tie 122 or cord that wraps around the frame member 52, 53, 55 and secures the panel 302 thereto. The battery charging unit 150 is secured along a centerline of the panel and extends radially outwardly from the frame tube. The battery charging unit, or center of gravity thereof, is positioned between the mounting arrangements 314, thereby ensuring a secure attachment. The solar cell array 320 includes two branches 324, 326 located on the side regions on opposite sides of the longitudinal centerline 2. Each branch is configured with five solar cells 146 connected in series, with the two branches 324, 326 being connected in parallel.

Figure 12A:
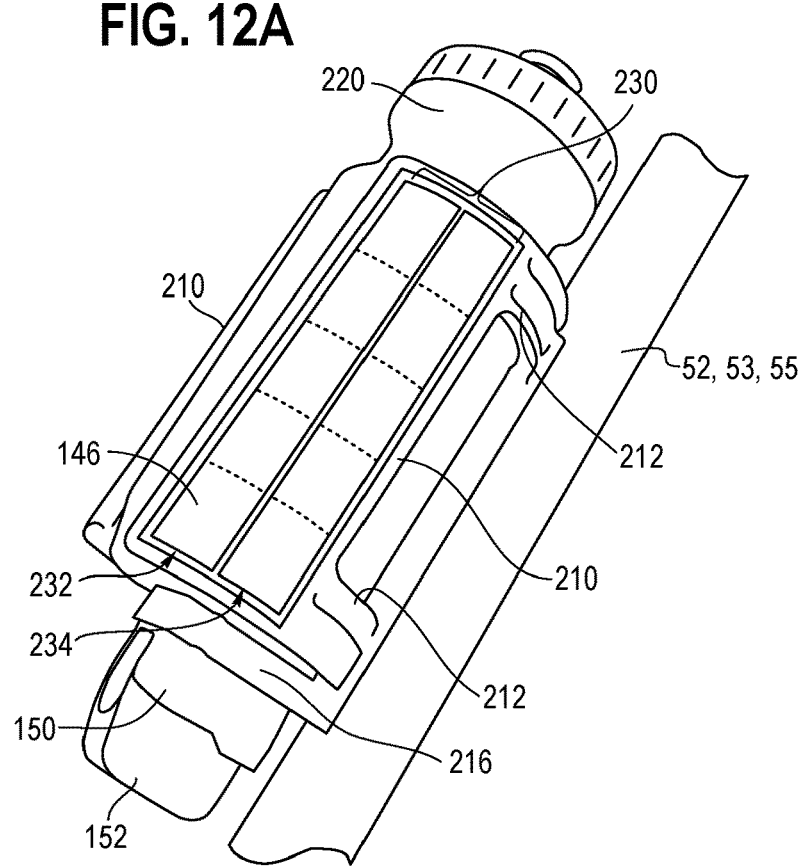
FIGS. 12A and B are perspective assembly and front view views of a water bottle cage with charging components coupled thereto.
Figure 12B:
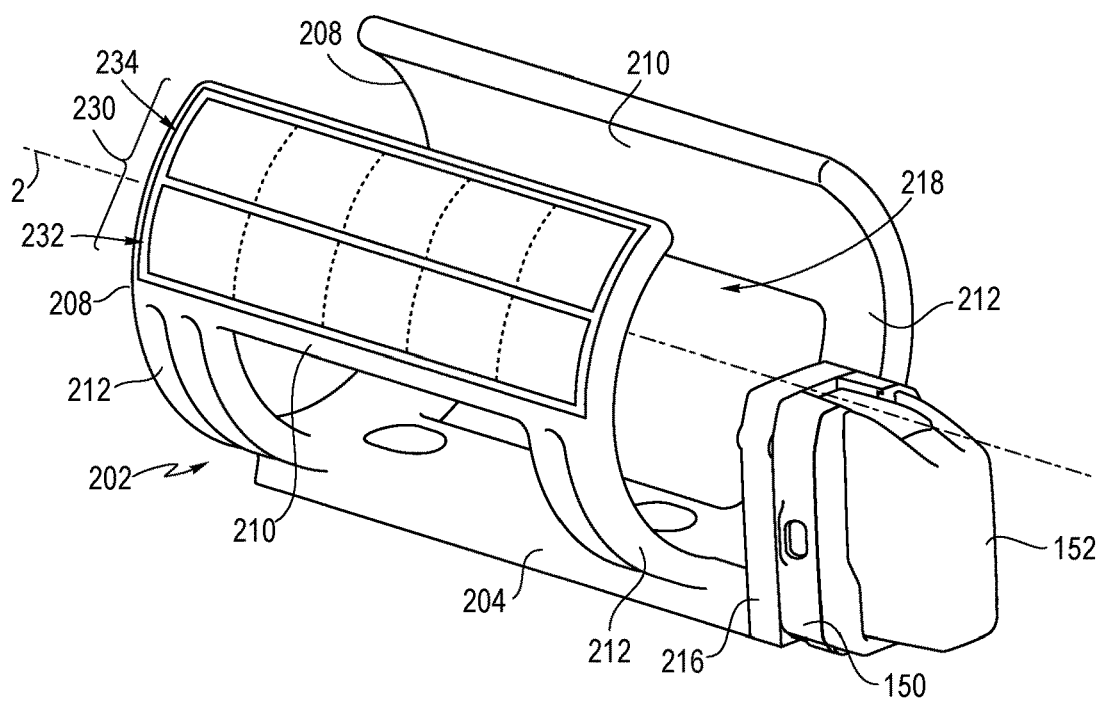

Referring to FIGS. 12A and B, the platform is configured as a bottle cage 202 having a central mounting spine 204 configured with a mounting arrangement 206, shown as a pair of openings, which mounts to the bicycle frame for example with fasteners engaging a frame tube 52, 53, 55. The cage includes opposite flexible arms 208, each configured with a curved panel 210 and a pair of curved, flexible legs 212 spaced apart along the longitudinal axis 2. The battery charging unit 150 is secured to a support platform 216, which extends upwardly from the spine 204 and closes off a cavity 218 defined between and by the panels. The support platform defines a floor that engages and holds a bottle 220 installed in the cavity 218. The solar cell array 230 includes two branches 232, 234 located on each of the side panels on opposite sides of the longitudinal centerline 2. Each branch is configured with five solar cells 146 connected in series, with the four branches 232, 234 being connected in parallel.

The illustrations of the embodiments disclosed herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

Although embodiments have been described for illustrative purposes, those skilled in the art will appreciate that various modifications, additions, and substitutions are possible, without departing from the scope and spirit of the disclosure. It is therefore intended that the foregoing description be regarded as illustrative rather than limiting, and that it be understood that all equivalents and/or combinations of embodiments and examples are intended to be included in this description.

Although certain parts, components, features, and methods of operation and use have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A battery charging system for a bicycle comprising:
a platform comprising a mounting arrangement adapted to be mounted to the bicycle;
a solar cell array arranged on the platform;
a battery charging unit arranged on the platform, the battery charging unit comprising:
  a capacitor operatively connected to the solar cell array, wherein the capacitor is operative to store energy transmitted from the solar cell array, and wherein the capacitor stores the energy at a first voltage;
  a boost converter operatively connected to the capacitor, wherein the boost converter is operative to step up the first voltage to a second voltage;
  a battery operatively connected to the boost converter, wherein the boost converter transmits power to the battery at the second voltage;
  a microcontroller operatively connected to the capacitor and to the boost converter, wherein the microcontroller is operative to signal the boost converter to transmit the power to the battery, and wherein the microcontroller is operative to receive power from the capacitor; and
  a power management integrated circuit (PMIC) operatively connected between the capacitor and microcontroller, wherein the PMIC is operative to allow power flow from the capacitor to the microcontroller when the first voltage exceeds a first predetermined value, and wherein the PMIC is operative to stop power flow from the microcontroller when the first voltage drops below a second predetermined value.

2. The battery charging system of claim 1 further comprising a battery sensor circuit operatively connected between the battery and the microcontroller, wherein the battery sensor circuit is operative to enable power transfer from the battery to the microcontroller.

3. The battery charging system of claim 1 wherein the boost converter is operative to receive a signal from the microcontroller to perform maximum power point tracking, wherein the first voltage is compared to a predetermined maximum power point voltage and optimizes the power transmitted to the battery at the second voltage.

4. A battery charging system for a bicycle comprising:
a platform comprising a mounting arrangement adapted to be mounted to the bicycle;
a solar cell array arranged on the platform and comprising at least a first branch and a second branch connected in parallel, each of the first and second branches comprising respective first and second pluralities of solar cells connected in series, wherein the first and second branches have first and second lengths respectively, wherein the first and second lengths are less than 160 mm; and
a battery charging unit arranged on the platform and operatively connected to the first and second branches, wherein the battery charging unit is operative to transmit power to a battery at a voltage of between 6.0 and 8.4 volts,
wherein the voltage comprises a second voltage, and wherein the battery charging unit further comprises:
  a capacitor operatively connected to the solar cell array, wherein the capacitor is operative to store energy transmitted from the solar cell array, and wherein the capacitor stores the energy at a first voltage;
  a boost converter operatively connected to the capacitor, wherein the boost converter is operative to step up the first voltage to the second voltage; and
  a microcontroller operatively connected to the capacitor and to the boost converter, wherein the microcontroller is operative to signal the boost converter to transmit power to a battery, and wherein the microcontroller is operative to receive power from the capacitor, and
wherein the PMIC is operatively connected between the capacitor and microcontroller, and the PMIC is operative to allow power flow from the capacitor to the microcontroller when the first voltage exceeds a first predetermined value, and wherein the PMIC is operative to stop power flow from the microcontroller when the first voltage drops below a second predetermined value.

5. The battery charging system of claim 4 wherein the first and second branches have first and second number of cells respectively, wherein each of the first and second numbers are equal to or less than five.

* * * * *